United States Patent

[11] 3,607,608

[72] Inventor August C. Siefert
  Granville, Ohio
[21] Appl. No. 520,871
[22] Filed Jan. 17, 1966
[45] Patented Sept. 21, 1971
[73] Assignee Owens-Corning Fiberglas Corporation

[54] FIBER-REINFORCED CERAMICS
  6 Claims, No Drawings
[52] U.S. Cl. ..................................................... 161/170,
  106/55
[51] Int. Cl. ..................................................... C04b 35/70
[50] Field of Search ............................................. 156/89;
  161/92, 93, 156, 169, 170, 192, 193, 196, 206,
  207, DIG. 4; 106/39, 47, 50, 52, 53, 54, 55;
  117/129; 29/193

[56]   References Cited
   UNITED STATES PATENTS
2,934,443   4/1960   Shell et al. ..................... 106/53 X

| 2,937,101 | 5/1960 | Nelson et al. | 161/DIG. 4 |
| 3,244,481 | 4/1966 | Berry | 106/55 X |
| 3,252,814 | 5/1966 | Russell et al. | 106/55 X |
| 3,298,897 | 1/1967 | Shannon | 106/55 X |

Primary Examiner—Robert F. Burnett
Assistant Examiner—Linda M. Carlin
Attorneys—Daniel D. Mast and Staelin & Overman ABSTRACT: A composite having high strength and impact resistance comprising from 30 to 90 percent by volume of a glassy material from the group consisting of the following approximate formulations given in approximate percentages by weight: 4% $SiO_2$, 3% $Al_2O_3$, 10% $B_2O_3$, 83% PbO; and 28.7% $SiO_2$, 9.1% CaO, 11.77% $Na_2O$, 26.3% $B_2O_3$, 5.3% ZnO, 17.2% BaO, and 3.1% $F_2$; and having from 10 to 70 percent by volume of stainless steel fibers, boron fibers, or graphite fibers.

FIBER-REINFORCED CERAMICS

This invention relates to high elastic modulus, high strength, high-temperature-resistant materials, and especially to composite materials comprising particulate materials such as fiber, flake, platelets, crystals, whiskers and particles combined with a matrix material.

Because of the progressively higher performance requirements demanded of structural materials by the aviation, aerospace, marine and automotive industries, single monolithic materials which are approaching their limits in performance are found to be inadequate. Composite materials make it possible to improve performance by obtaining a higher modulus of elasticity, higher strength, higher temperature resistance, resistance to oxidation at high temperatures, higher impact resistance, and less sensitivity to surface defects. These composites often times have a desirably low density.

It is an object of this invention to provide these properties in composite materials which have heretofore been unavailable.

It is a further object to provide structural materials that exhibit and retain these properties over a wide range of working temperatures that may be experienced during use.

It is also an object to provide high strength to weight ratio structural materials having high temperature resistance.

These objects are attained by combining a ceramic matrix with a reinforcement to provide a composite suitable for use as a structural material. The matrix is preferably a high-temperature-resistant material such as a ceramic, a mixture of fused oxides, a glass or a fused salt. A ceramic is any of a class of inorganic nonmetallic products which are subjected to a high temperature during manufacture or use. Typically, but not exclusively, a ceramic is a metallic oxide, boride, carbide or nitride, or a mixture of compound of such materials; i.e., includes anions, that play important roles in atomic structures and properties. A glass is an inorganic product of fusion which has cooled to a rigid condition without crystallizing. A compound of a metal with a nonmetal or a nonmetal radical is a salt and a fused salt is one of these that has been melted. The mixture of fused oxides may be totally or partially devitrified.

The reinforcement material is preferably fibrous but a great number of different fibers, both with respect to form and to composition, are combined with the ceramic matrix in accordance with the invention. For instance, individual filaments, groups of filaments or fibers, strands, yarns, cords, fabric, mats, batts and combinations of these one with another or with other forms of fiber may be used. The fibers should preferably be the high modulus of elasticity component of the composites. The fibers may be ceramics, metals, and alloys, a form of carbon, or combinations of these. Ceramics include glass, carbides such as silicon carbide, nitrides such as boron nitride, oxides such as aluminum oxide, devitrified glasses, and others. Metals and alloys include boron, stainless steel, columbium, beryllium and others.

In making the improved composites it is generally preferred to combine a relatively high modulus reinforcement material with a relatively lower modulus matrix material; however, this particular relationship may only exist at the temperature at which the composite is used and not necessarily at all temperatures. For instance, upon heating a composite it is found that some fiber reinforcements exhibit an increase in modulus.

Stainless steel fibers (304-type austenitic) having an average diameter of about fifty hundred-thousandths of a inch are combined with a glass composition that is molten at about 1,100° F. to produce a composite. For instance, a plurality of fibers is directed as a strand through a molten bath of Glass A which comprises about 4 percent $SiO_2$, 3 percent $Al_2O_3$, 10 percent $B_2O_3$ and 83 percent PbO, all percentages being by weight, and the fibers and glass are pressed together into a composite as they are forced through a constricted zone. As the fibers are moved into a compacted, side-by-side position, the matrix material surrounds each fiber and then solidifies to form an integral composite structure. The composite comprises 30 percent by volume fiber. The composite exhibits high flexural strength, high stiffness and high impact resistance. This composite is much more impact resistant than glass or ceramic, stronger than aluminum, and can withstand 900° F. for extended periods of time without serious loss of its properties. The composite is notch insensitive so that imperfections, scratches or notches do not have a major effect on its properties. The glass matrix has a modulus of 7 to $8 \times 10^6$ p.s.i., and the steel fibers a modulus of $29 \times 10^6$ p.s.i. This difference in moduli represents a desired relationship to secure the advantages described. The above composite was prepared by utilizing 50 percent by volume fiber with good results. This heat treatment of the composite causes the reinforcing fibers to react with the matrix to a limited extent. Also the glass matrix devitrifies during heat treatment to form a multioxide crystal matrix. These reactions provide higher temperature resistance.

The stainless steel fibers of the above composite are combined with Glass B which comprises 28.7 percent $SiO_2$, 9.1 percent CaO, 11.7 percent $Na_2O$, 26.3 percent $B_2O_3$, 5.3 percent ZnO, 17.2 percent BaO and 3.1 percent $F_2$, all percentages being by weight. The composite comprises 50 percent by volume glass fibers. The glass matrix is maintained at a temperature of 1,800° F. when it is combined with the fibers. As compared to the above stainless steel fiber and lead glass composite, the present composite is less dense because the matrix has a lower density. Also the composite has a higher specific modulus and higher specific strength. It also can withstand temperatures of about 1,100° F. for extended lengths of time while remaining dimensionally stable and without serious loss of other physical properties. The properties of this composite are relatively insensitive to the effect of notches in the composite and it has high impact resistance. The glass matrix has a modulus of about $10 \times 10^6$ p.s.i.

In making another composite graphite fibers are used to reinforce Glass B. These fibers are packed closely, one to another, to provide a composite that is 50 percent fiber by volume. These fibers, which have a tensile strength of 200,000 p.s.i. and a modulus of 25,000,000 p.s.i., provide a composite having an unusually high modulus of elasticity. This property is the result of the fiber having a modulus 2.5 times that of the matrix glass. The fiber has a low specific gravity, about 1.5 gm./cc.; therefore, the composite has the desirable feature of a very high modulus to density ratio. The glassy matrix protects the graphite fibers from oxidation when the composite is heated to red heat or above.

In still another embodiment boron fibers are used to reinforce ceramics. For example, boron fibers are used to reinforce Glass A or Glass B. With Glass A as the matrix, reactions with the boron are quite severe. In some instances, part of the lead oxide in the glass is reduced by the boron and precipitated as metallic lead. With Glass B care must be taken to avoid overheating the boron fibers. It is preferable to form the composite at temperatures of less than 1,700° F. It is sometimes difficult to wet the boron fibers thoroughly with the melt. In many cases the wetting may be accomplished by controlling the viscosity of the glass. In other cases it is desirable to treat the boron fibers with surface treatments. Water solutions of chromic sulfates and sodium silicate are effective.

Boron fibers at the present time are relatively large in diameter, about 0.004 inch. In contrast steel fibers and glass fibers used are about 0.0005 inch in diameter. With the coarse boron fibers it is more difficult to imbed them in a ceramic matrix without forming cracks in the matrix. This cracking is the result of very high stresses per unit of surface area of the boron fiber. It is desirable to match the coefficients of thermal expansion of the boron and ceramic matrix as much as possible. A composition like Glass A has a coefficient of thermal expansion which does not differ much from that of boron. Other glass compositions having a suitable coefficient of expansion may be used.

In still another embodiment glass fibers comprising 65 percent silica, 25 percent alumina and 10 percent magnesia, all percentages being by weight, are packed in a tube with the ends of the fibers extending from the tube. A melt of vanadium pentoxide maintained at a temperature of about 1,200° F. is provided. The exposed ends of the fibers and a part of the tube are immersed in the melt comprising 85 percent vanadium pentoxide and 15 percent sodium oxide, percentages being by weight. The opposite end of the tube, the nonimmersed end, is connected to a suction line to draw the molten vanadium oxide into the tube by suction and into intimate association with the fibers. After the matrix cools, the tube is removed to reveal a bonded glass fiber composite.

Glass fibers are used to make fiber-reinforced ceramics. The glass fibers should have a higher modulus than the matrix. In some cases bare glass fibers are used and incorporated into the ceramic matrix by one of the processes described hereafter. It is sometimes desirable to provide surface treatments for the glass fibers. For example, when glass fibers are used to reinforce a glass matrix, some molten glasses react vigorously with the reinforcing fiber and deteriorate it badly. To retard these reactions, coatings of ceramics, metals, or various forms of carbon are used.

Examples of ceramic surface treatments include dispersions in aqueous or nonaqueous media of oxides such as chromic oxide, and carbides such as silicon carbide. Some of these ceramic treatments may be applied by vapor deposition.

Examples of metals which are used to protect the glass fibers include aluminum, nickel, chromium, cobalt, alloys of these elements, and others. These metals may be applied from a melt, or by vapor or electrodeposition. Metals may also be applied to glass fibers from chemical solutions. Various forms of carbon, such as graphite, may also be used to protect the fiber. Carbon may be applied by methods similar to those described above. Boron nitride is a suitable protective agent since it resists the action of molten ceramics, including fused salts and glasses.

It is desirable to use compositions of glass fibers which do not react readily with molten ceramics. For example, glasses which tend to be immiscible at high temperatures are most appropriate. Glass fibers containing silica, calcium oxide and boric oxide in the proper proportions are used to reinforce glass matrices containing the same ingredients, but in different proportions. In this way a high-temperature reinforcing fiber may be used to reinforce a lower melting glass matrix without having excessive degradation of the fiber by the molten glass.

The processes for combining these materials in the form of composites may vary. These methods for forming have been given various designations such as vacuum injection, hot pressing, pulltrusion and others but the particular process used is not critical as long as complete and intimate mixing and association of the substances is achieved.

In general, the processing of fiber-reinforced glasses is similar to the processing of reinforced plastic materials. Glass, one of the inorganics contemplated here, is a thermoplastic just as are some of the organic polymers or thermoplastics used in making reinforced products; the inorganic glasses are processed at higher temperatures than the known organic thermoplastics.

In the process designated pulltrusion fibers are pulled through the molten or fused matrix and into molds. The composite is allowed to cool in the mold until it retains its shape and the mold is then removed to leave the finished product. Any flash or roughness is removed by sawing, grinding, or a suitable machining operation, if desired. In hot pressing, a preimpregnated material containing the fibers and matrix is prepared by pulling the fibers through a melt or by pouring a melt onto fibers, and this combination allowed to cool. This prepreg is then placed in a mold and subjected to heat and pressure to form the final composite. If desirable, the fiber is placed in a mold and the molten ceramic material is poured onto the fibers and the combination is then molded into a composite.

In other processes, the melt is injected into an evacuated mold which contains the fiber. Fibers and a melt are extruded through a die in an extrusion process that is suitable for forming a prepreg or a final product. Filament-winding processes are used to produce various structures. Reinforcing fiber is drawn through a melt and then wrapped on a suitable mandrel. Heat and pressure can be utilized to cause the matrix material to flow and form a void-free structure. The matrix material is combined as a low-melting fibrous material with the reinforcing fibers in another procedure. This combination of fibers is heated to cause the low-melting fiber to flow and form a fiber and matrix composite.

A preform comprising fibers and matrix material may be molded or placed in a centrifugal casting device to form the final composite. Molten material may be added to the centrifugal casting apparatus which already contains the preform or fibers alone. The composite is spun and formed as the melt cools and hardens.

The ceramic material does not have to be molten when added to the fibers or when the fibers are added to it. For instance, films, fibers, flakes or other forms of a ceramic are added to the reinforcing fibers such as metal fibers and then the combination heated and pressed to form the composite. Specifically, layers of steel fibers layed up with alternate layers of glass fibers are heated to form a composite. The glass fibers flow to surround the metal fibers as a binder or matrix.

The matrix material carries out a number of very important functions. It spaces the fiber, holds the fiber in the spaced relationship, transfers stress from fiber to adjacent fiber, protects the fibers from the atmosphere, and binds the fibers together as an integral composite. When the reinforcement is a fabric, the matrix spaces layers of fabric one from another, holds the layers of fabric in the spaced position, and bonds the layers of reinforcement into an integral composite structure. Laminates comprising multiple layers of bonded fabric are exceptionally strong and stiff structural materials. If desirable, in addition to the primary fiber reinforcement short fibers or whiskers of a high modulus material such as SiC, $Al_2O_3$ or the like can be added to the matrix to add an interstitial reinforcement.

Some of the fibers and their significant properties are:

REINFORCING FIBERS

| | Density (lb./ cu. in.) | Tensile strength (thousand p.s.i.) | Strength to density ratio (million inches) | Elastic modulus (million p.s.i.) | Modulus to density ratio (million inches) | Limiting temp. (in air ° F.) |
|---|---|---|---|---|---|---|
| Continuous filaments: | | | | | | |
| S-glass [1] | 0.090 | 700 | 7.8 | 12.5 | 140 | 1,400 |
| E-glass | 0.090 | 500 | 5.6 | 10.5 | 117 | 1,000 |
| Boron | 0.091 | 500 | 5.5 | 60 | 660 | 2,400 |
| Steel | 0.280 | 300 | 1.1 | 29 | 103 | 1,200 |
| Carbon | 0.060 | 250 | 4.2 | 30 | 500 | 1,600 |
| Whiskers: | | | | | | |
| Aluminum oxide | 0.143 | 2,500 | 18 | 60 | 420 | 3,500 |
| Silicon oxide | 0.115 | 1,600 | 14 | 70 | 610 | 2,000 |

[1] Magnesium aluminum silicate.

Fibers, whether in the form of individual fibers, strands, yarns or fabric, tend to inhibit or limit the growth and size of crystals which might form in the matrix component. Fibers may be from 10 percent to 70 percent and the ceramic matrix from 30 percent to 90 percent, all percentages being by volume.

These composites have many uses in addition to their use as structural materials. They can be used where their particular thermal properties are desirable. These composites can be made to have directional properties by orienting the fibers. Thus, they can conduct heat more in one direction than another. Or, from another point of view, they can provide a heat insulation more in one direction than another. Furthermore, because they are combinations of materials, they have properties that are unlike those of the constituents. They may find applications in nozzles, nose cones, heat shields, gaskets, seals, and the like.

These composites have electromagnetic properties which differ from those of the constituent materials and can be oriented or directional. They may find application as electrical conductors or insulators, as filters for radiation, including ultraviolet and ultrared radiation, as components having unique dielectric properties, etc.

Their chemical properties, particularly their corrosion resistance, should resemble those of ceramic materials more than that of metals. It is feasible to use such materials without protective coatings, such as the paints which are used to protect metals.

Because of their high impact resistance and insensitivity to the effect of notches or surface abuse, these composites may be used in armor, both to protect personnel and equipment, such as tanks and airplanes.

I claim:

1. A composite having high strength and impact resistance comprising: from 30 to 90 percent by volume of a glassy material from the group consisting of the following formulations in approximate percentages by weight: 4 percent $SiO_2$, 3 percent $Al_2O_3$, 10 percent $B_2O_3$ and 83 percent PbO; and 28.7 percent $SiO_2$, 9.1 percent CaO, 11.77 percent $Na_2O$, 26.3 percent $B_2O_3$, 5.3 percent Zno, 17.2 percent BaO and 3.1 percent $F_2$; and having from 10 to 70 percent by volume of fibers therein from the group consisting of austenitic stainless steel fibers, boron fibers and graphite fibers, the surface of which is bonded to the glass.

2. The composite of claim 1 comprising: a glassy material having the following approximate composition in percent by weight: 4 percent $SiO_2$, 3 percent $Al_2O_3$, 10 percent $B_2O_3$ and 83 percent PbO, and austenitic stainless steel fibers.

3. The composite of claim 1 comprising: a glassy material having the following approximate composition in percent by weight: 28.7 percent $SiO_2$, 9.1 percent CaO, 11.7 percent $Na_2O$, 26.3 percent $B_2O_3$, 5.3 percent Zno, 17.2 percent BaO and 3.1 percent $F_2$; and austenitic stainless steel fibers.

4. The composite of claim 1 comprising: a glassy material having the following approximate composition in percent by weight: 4 percent $SiO_2$, 3 percent $Al_2O_3$, 10 percent $B_2O_3$ and 83 percent PbO, and boron fibers.

5. The composite of claim 1 comprising: a glassy material having the following approximate composition in percent by weight: 28.7 percent $SiO_2$, 9.1 percent CaO, 11.7 percent $Na_2O$, 26.3 percent $B_2O_3$, 5.3 percent Zno, 17.2 percent BaO and 3.1 percent $F_2$; and boron fibers.

6. The composite of claim 1 comprising: a glassy material having the following approximate composition in percent by weight: 28.7 percent $SiO_2$, 9.1 percent CaO, 11.7 percent $Na_2O$, 26.3 percent $B_2O_3$, 5.3 percent Zno, 17.2 percent BaO and 3.1 percent $F_2$; and graphite fibers.